United States Patent Office 3,125,562
Patented Mar. 17, 1964

3,125,562
DISAZO DYESTUFFS
Jurg Ammann, Basel, and Werner Bossard, Riehen, near Basel, Switzerland, assignors to J. R. Geigy A.-G., Basel, Switzerland
No Drawing. Filed Mar. 17, 1961, Ser. No. 96,400
Claims priority, application Switzerland Mar. 18, 1960
6 Claims. (Cl. 260—146)

The present invention concerns reactive disazo dyestuffs for cellulosic material, processes for the production of the new dyestuffs, their use to attain fast cellulose dyeings and the material fast dyed or printed therewith.

It has been found that dyestuffs of the general formula

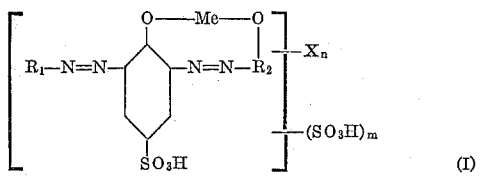

(I)

wherein $R_1$ represents the radical of any coupling component desired,
$R_2$ represents the radical of a coupling component in which —O—Me— is in ortho-position to the azo group,
X represents the radical of a heterocyclic imide halide bound by way of an amido group to $R_1$ or $R_2$ which contains at least one reactive halogen atom,
Me represents a heavy metal of the atomic numbers 24 to 29 which can also contain other complex formers co-ordinately bound,
$n$ represents a whole number of at most 2, and
$m$ represents a whole number of at most 4, are valuable reactive dyestuffs for fibres containing cellulose.

The dyestuffs according to the invention are obtained by two different processes. The first consists in reacting metal-containing disazo dyestuffs which correspond to the general Formula I in which X is an acylatable amino group, with a heterocyclic poly-C-imide halide, the reaction being performed under such conditions that the end product contains at least one reactive halogen atom. By such cyclic imide halides which contain several reactive groupings

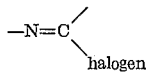

are meant chiefly halogen azine compounds of aromatic character which contain two tertiary ring N atoms and at least two mobile halogen atoms of the atomic numbers 17 to 35 at ring C atoms adjacent thereto, that is, for example, 2,4- or 4,6-dichloropyrimidines, 2,4- or 4,6-dibromopyrimidines which contain in the remaining positions other substituents, in particular further halogen atoms or negative groups such as the nitro, acyl, cyano or also only alkyl or phenyl groups, and finally, also tetrameric cyanogen chloride or cyanogen bromide.

The reaction conditions are so chosen that too previous exchange of mobile groups does not occur due to too high pH values of the reaction medium or to too high temperature. Thus the reaction is performed in the aqueous solutions of the alkali metal salts of metal-containing dyestuffs at temperatures and pH values as low as possible, if necessary in the presence of agents which buffer the mineral acid such as alkali metal salts of low fatty acids, i.e. at pH values of about 2 to 8 and at temperatures of 0 to about 60° C. depending on the stability of the acylating agent or the mobility of the substituents capable of exchange in the group X. The acylating agents are used in at least the equimolecular amount and, depending on their properties, in a fine dispersion, for example as suspensions or emulsions, if necessary with the aid of inert organic solvents which can easily be removed, such as low ketones. The acylating agent is allowed to act until the amino group to be acylated can no longer be detected, e.g. by diazotising and coupling when it is a primary amino group which is preferably the case. The dyestuffs according to the invention must also be isolated and dried with care, for example by salting out the alkali metal salt with sodium chloride in a neutral to weakly acid solution and by drying at moderately raised temperature, advantageously in vacuo.

The second process for the production of the dyestuffs according to the invention consists in reacting dyestuffs of the general Formula II

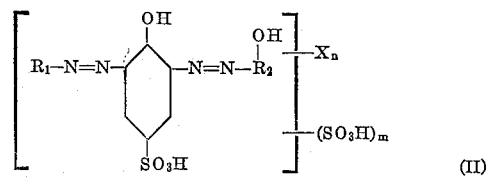

(II)

wherein the symbols $R_1$, X, $n$ and $m$ have the meanings given in Formula I and the radical $R_2$—OH represents the radical of an azo component coupling in o-position to the hydroxyl group, with an agent introducing a heavy metal of the atomic numbers 24 to 29 in which the heavy metal may already be bound in complex linkage.

The metallisation must be performed under the most careful conditions possible because of the presence of substituents which can easily be exchanged but which should remain in the end product. Advantageously it is performed in a weakly acid to neutral medium at not too high temperatures, for example with mineral acid salts of copper, chromium or cobalt in the presence of alkali metal salts of lower fatty acids. However, as agents introducing metal, also complex salts, particularly of the co-ordinative hexavalent metals chromium and cobalt which already contain uncoloured or coloured compounds bound in complex linkage can be used; in this case are meant in particular complex chromium compounds which contain aromatic o-hydroxycarboxylic acids or contain only one o,o'-dihydroxy-, o-hydroxy-o'-amino- or o-hydroxy-o'-carboxy-azo dyestuff per metal atom. Mixed complex dyestuffs according to the invention can be produced by this method. The remarks given above as to the reaction and isolation conditions to be adhered to pertain in this case also.

Disazo compounds of the general Formula III

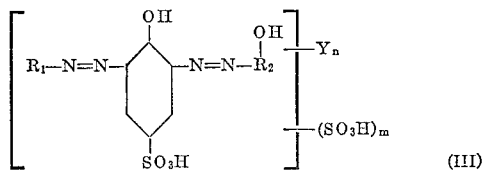

wherein Y is a primary or secondary acylatable amino group and the other symbols have the meanings given in Formula II, are the primary starting materials for both the processes according to the invention.

Such disazo compounds, for the production of which no protection is claimed here, are obtained, for example, by coupling one mol of tetrazotised 1-hydroxy-2,6-diaminobenzene-4-sulphonic acid with two mols of an azo component or with one mol of each of two different azo components, whereby this or at least one of these azo components must couple in a position adjacent to a hydroxyl group. In addition the azo component or at least one of them must contain at least one primary or secondary amino group which can still be acylated in the coupling product.

It is also possible to form the acylatable amino groups only after the coupling, for example by reduction of nitro groups to amino groups or by saponification of acylamino groups or aminoethylene sulphonic acid groups. It is also possible first to react amino groups in the azo components with m- or p-nitrobenzoyl chloride and then to reduce the nitro group in the benzoyl radical to the amino group. However, advantageously those azo components are used in which acylatable amino groups are already present. Such components are, principally, amino compounds of the benzene, naphthalene and pyrazolone series, thus, e.g. aniline and its homologues and substitution products coupling in the p-position to the amino group such as, e.g., m-toluidine, xylidines, cresidine, aminohydroquinone dimethyl or diethyl ethers and m-phenylenediamine, also as aminonaphthalene compounds, e.g. 1-aminonaphthalene, 1- or 2-amino-5-hydroxynaphthalene-7-sulphonic acid, 1-amino-8-hydroxynaphthalene-4-, -5-, or -6-sulphonic acids, 2-amino-6-hydroxynaphthalene-8-sulphonic acid, 2-amino-8-hydroxynaphthalene-6-sulphonic acid, 2-amino-8-hydroxynaphthalene-3,6-disulphonic acid and 1-amino-8-hydroxynaphthalene-3,6-, or -4,6-disulphonic acid, and as pyrazolone derivatives, e.g. 1-(3'- or 4'-aminophenyl)-3-methyl-5-pyrazolone and 1-(3'-amino-6'-sulphophenyl)-3-methyl-5-pyrazolone.

Unsymmetrical disazo compounds of the general Formula III in which only one of $R_1$ and $R_2$ contains an acylatable amino group are preferred primary starting materials. Advantageously they contain, as the one azo component, a radical not having primary or secondary amino groups. This radical however, can contain acylated, tosylated, benzoylated or methyl sulphonated amino groups. Even azo components containing amino groups can be used provided that, due to steric hindrance, the amino groups can only be acylated with difficulty.

For the pad dyeing and printing of cellulose fibres it is important that the dyestuffs according to the invention in the form of their alkali metal salts dissolve very well even in salt-containing and weakly acid aqueous liquor. Good solubility is to be ensured by the choice of components. Thus, for example, copper-containing dyestuffs with 1 metal atom per dyestuff molecule should contain at least two and advantageously 3 to 5 sulphonic acid groups. Chromium or cobalt-containing dyestuffs in which 1 metal atom is bound to two dyestuff molecules are often sufficiently soluble even when only two sulphonic acid groups are present. It is also possible for some of the sulphonic acid groups to be in the substituent X and, in chromium or cobalt-containing 1:2 complex dyestuffs, also in the radical of that complex former which does not correspond to the general Formula III.

If disazo compounds of the general Formula III are treated by the usual methods with agents introducing heavy metal of the atomic numbers 24 to 29, then the starting materials for use in the first process for the production of reactive dyestuffs according to the invention are obtained. Starting materials for the second process are obtained if the disazo compounds of the general Formula III are reacted under the conditions already given above, with cyclic poly-C-imide halides.

Particularly valuable dyestuffs correspond to the formula

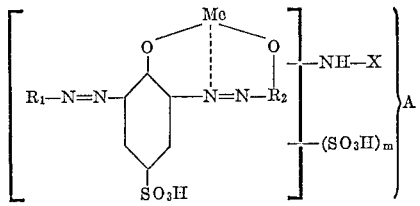

wherein of $R_1$ and $R_2$, one R represents the radical of a naphtholic coupling component and the other R represents the radical of a member selected from the group consisting of coupling components of the benzene, naphthalene and 5-pyrazolone series, the group —Me—O— being bound in a position vicinal to the azo group,
X represents a chloropyrimidyl radical, the group —NHX being bound to one of the R's,
Me represents a member selected from the group consisting of

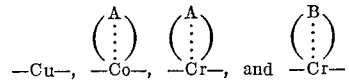

wherein A corresponds to the radical of a disazo dyestuff of the aforesaid formula and B corresponds to the radical of an ortho:ortho'-dihydroxy monoazo dyestuff of the naphthol-azo-naphthol series, and
$m$ is a whole positive number of at most 4.

The one R, which must be the radical of a naphtholic coupling component, is, in particular, a 1-hydroxynaphthyl-(3)-sulphonic acid radical containing the reactive group —NHX in the 8-position. The other R is advantageously also the radical of a naphtholic coupling component coupled in o-position to the hydroxyl group, such as, e.g. naphthol or aminonaphthol sulphonic acid. However, it can also be the radical of a coupling component of the benzene series such as 1,3-dihydroxybenzene or also 1-amino-3-methylbenzene, or it can be of the pyrazolone series such as 1-phenyl-, 1-chlorophenyl- or 1-sulphophenyl-3-methyl-5-pyrazolone.

In the above formula, the reactive radical X is a dichloro-pyrimidyl radical which can contain a substituent in the remaining position, in particular a further halogen atom such as e.g. the 4,5,6-trichloropyrimidyl-(2) or 2,5,6-trichloropyrimidyl-(4) radical, the 4,6-dichloro-5-bromopyrimidyl-(2) or 2,6-dichloro-5-bromopyrimidyl-(4) radical or the 4,6-dichloropyrimidyl-(2) or 2,6-dichloropyrimidyl-(4) radical.

Dyestuffs which contain the trichloropyrimidylamino group are preferred. It is difficult to determine from the dyestuff molecule which halogen atom of the tri- or tetrahalogen pyrimidine is exchanged for the dyestuff amino radical. The latter radical is, therefore, bound to the pyrimidine ring in the 2- or 4-position.

Me, in the above formula, is firstly copper, secondly cobalt in which case two dyestuff molecules are bound, and thirdly chromium in which case also two dyestuff molecules are bound and one of them can also be a monoazo dyestuff of the naphthol-azo-naphthol series.

A preferred class of dyestuffs according to the invention therefore are especially those which contain one atom of a metal selected from the group consisting of copper, cobalt and chromium in complex union with one molecule, in the case of copper, and two molecules in the case of cobalt and chromium of a disazo dyestuff of the general formula

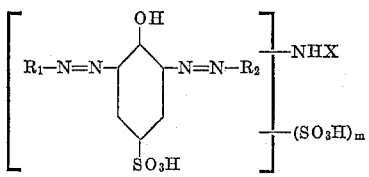

wherein $R_1$ represents the radical of a naphtholic coupling component containing the hydroxyl group in o-position to the azo group, $R_2$ represents the radical of a member selected from the group consisting of coupling components of the benzene, naphthalene and 5-pyrazolone series, X represents a chloropyrimidyl radical, the group —NHX being bound to one of the R's, and $m$ is a whole positive number of at most 4.

The preferences mentioned above are also true in this case, that is, the metal is advantageously copper, $R_1$ is advantageously a 1-hydroxynaphthyl-(3)-sulphonic acid radical containing the reactive group —NHX in the 8-position, $R_2$ is advantageously the radical of a naphtholic coupling component coupled in o-position to the hydroxyl group and X is advantageously the trichloropyrimidyl radical.

The heavy metal-containing reactive dyestuffs obtained by both processes are dark powders which, in the form of their alkali metal salts, dissolve well in water. They are suitable for the dyeing and printing of natural and synthetic polyamide fibres and, in particular, of natural and regenerated cellulose fibres such as cotton, viscose rayon, staple fibre, jute, hemp and ramie, in navy blue, brown-black, violet-black to neutral black shades.

Chromium, cobalt and, in particular, copper-containing dyestuffs having di- and tri-chloropyrimidylamino groups are distinguished not only in that they can be fixed well onto cellulose fibres, which enables relatively strong shades to be obtained, but also by the relatively very good stability of the printing pastes produced therewith.

Cellulose fibres are dyed or printed with the reactive dyestuffs according to the invention as follows: The fibres are impregnated or printed, advantageously at a low temperature of, for example, 20-50° C., with the possibly thickened dyestuff solution and then the dyestuff is fixed by a treatment with acid binding agents. As such are used e.g. sodium carbonate, potassium carbonate, di- and tri-sodium phosphate, caustic soda lye and, at temperatures of over 50° C., also potassium or sodium bicarbonate. Although this treatment with these agents can be performed even at room temperature or at a slightly raised temperature, often better results are attained at a raised temperature, e.g. at 70-160° C. (advantageously after a mild intermediate drying of the impregnated or printed goods). Instead of an alkaline after-treatment, particularly when fixing hot, the acid binding agent, advantageously in the form of alkali bicarbonates, can also be added to the impregnating liquors or printing pastes and then the dyeing is developed by a short heating at temperatures over 100° C. to 160° C. In this process, the addition of hydrotropic agents to the printing pastes and impregnating liquors is advantageous, for example the addition of urea in amounts of 10 to 200 g. per litre colouring agent.

The new dyestuffs are chemically bound to the fibre by the treatment with acid binding agents and, after soaping to remove non-fixed dyestuff, the cellulose dyeings attained therewith have excellent wet fastness properties and very good fastness to light.

The following examples serve to illustrate the invention. Temperatures are given therein in degrees centigrade. Where not otherwise expressly stated, parts are given as parts by weight. The relationship of parts by weight to parts by volume is as that of grammes to cubic centimetres.

In addition, as mentioned above, it is pointed out that the dyestuffs having a di- or tri-halogenpyrimidine group as reactive substituent are isomeric mixtures. On reacting aminoazo dyestuffs with tri- or tetra-halogenpyrimidine, part of the halogen in the 2-position and part of the halogen in the 4-position reacts; thus the pyrimidine radical is bound in either the 2- or 4-position to the amino group. In the dyestuff components given in the tables to the following example, it is assumed that this bond is in the 2-position of the pyrimidine ring. These formulae, however, are to be understood as a simplified representation of the isomeric mixture.

EXAMPLE 1

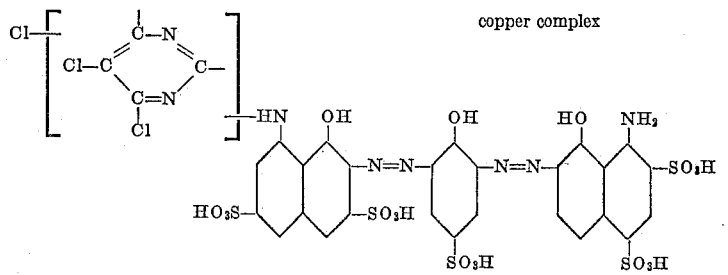

copper complex 105 parts of the sodium salt of the disazo dyestuff obtained by coupling, while keeping the pH at 4.0 by the addition of sodium acetate, tetrazotised 2,6-diamino-1-chlorobenzene-4-sulphonic acid with on the one hand 1-(4',5',6'-trichloropyrimidylamino) - 8-hydroxynaphthalene-3,6-disulphonic acid and on the other with 1-amino-8-hydroxynaphthalene-2,4-disulphonic acid, are dissolved with a neutral reaction in 1500 parts of water at 50-60°. After the addition of 30 parts of crystallised sodium acetate, an aqueous solution of 25.0 parts of crystallised copper sulphate is added dropwise. As soon as the metallisation is complete, the new copper-containing disazo dyestuff is precipitated by the addition of sodium chloride, filtered off and dried in vacuo at 50-60°. It is an isomeric mixture and is a dark powder which dissolves in water with a blue colour.

After treating cotton in the foulard with a solution which contains 40 parts of the above dyestuff, 20 parts of sodium carbonate and 200 parts of urea in 1000 parts of water, the goods are exposed for 5 minutes to a dry heat of 140-160° and are then soaped at the boil for 30 minutes. The navy blue dyeing so obtained has excellent wet and light fastness properties.

Dyestuffs having similar properties are obtained under the conditions given in the above example if disazo dyestuffs obtained in the known manner from 2,6-diamino-1-hydroxybenzene-4-sulphonic acid as tetrazo component and from coupling components given as $R_1$ and $R_2$ in the following Table 1 are treated with agents giving off copper.

Table 1

| No. | R₁ | R₂ | Shade of cellulose dyeing |
|---|---|---|---|
| 1 | 1-(4',5',6'-trichloropyrimidylamino)-8-hydroxynaphthalene-3,6-disulphonic acid. | 1-phenylamino-3-hydroxynaphthalene-4-sulphonic acid. | navy blue. |
| 2 | ____do____ | 1-phenylamino-8-hydroxynaphthalene-4,6-disulphonic acid. | Do. |
| 3 | ____do____ | 1-amino-8-hydroxynaphthalene-3,6-disulphonic acid. | Do. |
| 4 | 1-(4',6'-dichloropyrimidylamino)-8-hydroxynaphthalene-3,6-disulphonic acid. | 1-amino-8-hydroxynaphthalene-2,4-disulphonic acid. | Do. |
| 5 | 1-(4',5',6'-trichloropyrimidylamino)-8-hydroxynaphthalene-4,6-disulphonic acid. | ____do____ | Do. |
| 6 | ____do____ | 1-hydroxynaphthalene-4,8-disulphonic acid. | violetty navy blue. |
| 7 | 1-(4',5',6'-trichloropyrimidylamino)-8-hydroxynaphthalene-4-sulphonic acid. | ____do____ | Do. |
| 8 | ____do____ | 1-amino-8-hydroxynaphthalene-2,4-disulphonic acid. | navy blue. |
| 9 | 2-(4',5',6'-trichloropyrimidylamino)-8-hydroxynaphthalene-6-sulphonic acid. | 1,8-dihydroxynaphthalene-3,6-disulphonic acid. | reddish black. |
| 10 | 2-(4',5',6'-trichloropyrimidylamino)-5-hydroxynaphthalene-7-sulphonic acid. | 1-phenylamino-8-hydroxynaphthalene-4-sulphonic acid. | Do. |
| 11 | 1-(4',6'-dichloropyrimidylamino)-5-hydroxynaphthalene-7-sulphonic acid. | ____do____ | Do. |
| 12 | 2-(4',5',6'-trichloropyrimidylamino)-6-hydroxynaphthalene-8-sulphonic acid. | 1-amino-8-hydroxynaphthalene-2,4-disulphonic acid. | navy blue. |
| 13 | 1-(4',5',6'-trichloropyrimidylamino)-8-hydroxynaphthalene-3,6-disulphonic acid. | 1-benzoylamino-8-hydroxynaphthalene-3,6-disulphonic acid. | raisin. |
| 14 | ____do____ | 1-(4',5',6'-trichloropyrimidylamino)-8-hydroxynaphthalene-3,6-disulphonic acid. | reddish navy blue. |

EXAMPLE 2

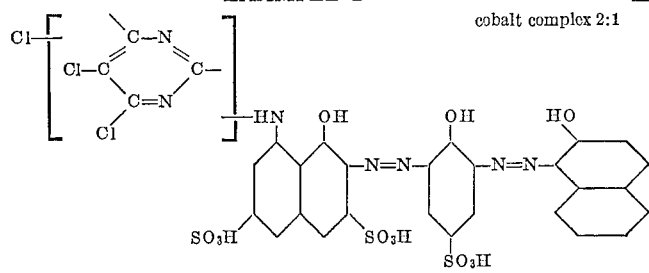

cobalt complex 2:1

87.0 parts of the sodium salt of the disazo dyestuff, obtained by coupling tetrazotised 2,6-diamino-1-hydroxybenzene-4-sulphonic acid with on the one hand 1-(4',5',6'-trichloropyrimidylamino) - 8 - hydroxynaphthalene-3,6-disulphonic acid and on the other with 2-hydroxynaphthalene, are stirred, with a neutral reaction, in 1000 parts of water. A solution of 12.5 parts of cobalt acetate in 50 parts of water is added at 50–60°. After the water soluble 2:1 cobalt complex has formed, the new dyestuff is salted out, filtered off and dried in vacuo at 50–60°. It is an isomeric mixture and is a dark powder which dissolves in water with a black colour.

If cotton is impregnated with a solution which contains 60 parts of the above dyestuff, 20 parts of sodium carbonate and 200 parts of urea in 1000 parts of water, then steamed for 5–10 minutes at 100–110° and finally soaped at the boil for 30 minutes then a black dyeing is obtained which has good wet and light fastness properties.

Dyestuffs having similar properties are obtained if disazo dyestuffs produced from 2,6-diamino-1-hydroxybenzene-4-sulphonic acid as tetrazo component and coupling components shown in Table 2 as R₁ and R₂ are converted under corresponding conditions into the 2:1 complex cobalt dyestuffs.

Table 2

| No. | R₁ | R₂ | Shade of cellulose dyeing |
|---|---|---|---|
| 1 | 1-(4',5',6'-trichloropyrimidylamino)-8-hydroxynaphthalene-4-sulphonic acid | 2-hydroxynaphthalene | black. |
| 2 | ____do____ | 2-hydroxynaphthalene-7-sulphonic acid | blue-black. |
| 3 | ____do____ | 1,3-dihydroxybenzene | black. |
| 4 | 1-(4',5',6'-trichloropyrimidylamino)-8-hydroxynaphthalene-3,6-disulphonic acid | 2-hydroxynaphthalene-7-sulphonic acid | blue-black. |
| 5 | ____do____ | 1,3-dihydroxybenzene | black. |
| 6 | ____do____ | 1-phenylamino-8-hydroxynaphthalene-4-sulphonic acid | Do. |
| 7 | 1-(5'-bromo-4'-6'-dichloropyrimidylamino)-8-hydroxynaphthalene-4,6-disulphonic acid | 2-hydroxynaphthalene | Do. |
| 8 | 1-(4',6'-dichloropyrimidylamino)-8-hydroxynaphthalene-3,6-disulphonic acid | ____do____ | Do. |
| 9 | 1-(5'-bromo-4',6'-dichloropyrimidylamino)-8-hydroxynaphthalene-3,6-disulphonic acid | ____do____ | Do. |
| 10 | 2-(4',6'-dichloropyrimidylamino)-5-hydroxynaphthalene-7-sulphonic acid | 1-amino-8-hydroxynaphthalene-2,4-disulphonic acid | reddish black. |
| 11 | 2-(4',5',6'-trichloropyrimidylamino)-8-hydroxynaphthalene-6-sulphonic acid | 2-hydroxynaphthalene-4-sulphonic acid | reddish black. |

EXAMPLE 3

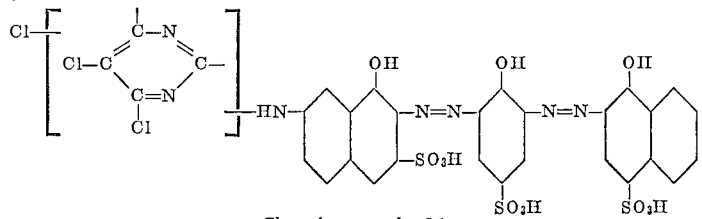

Chromium complex 2:1

71.3 parts of the 2:1 chromium complex of the amino disazo dyestuff, obtained by coupling tetrazotised 2,6-diamino-1-hydroxybenzene-4-sulphonic acid with, on the one hand, 2-amino-8-hydroxybenzene - 6 - sulphonic acid and, on the other, with 1-hydroxynaphthalene-4-sulphonic acid and treating the dyestuff by the usual methods with the sodium salt of disalicylato chromic acid, are dissolved in 800 parts of water with a neutral reaction. 24.0 parts of 2,4,5,6-tetrachloropyrimidine are stirred into this solution within one hour at 50–60°, the pH being kept at 6.5–7.0 by the simultaneous addition dropwise of a dilute sodium carbonate solution. As soon as no more diazotisable amino groups can be detected, the dyestuff is precipitated by the addition of sodium chloride, filtered off and dried in vacuo at 50–60°. It is an isomeric mixture and is a dark powder which dissolves in water with a black colour.

If cotton is treated in the foulard with a solution which contains 40 parts of the above dyestuff, 20 parts of sodium carbonate and 200 parts of urea in 1000 parts of water, then steamed for 5–10 minutes at 100–110° and finally soaped at the boil for 30 minutes, then a black dyeing is obtained which is fast to wet and light.

Similarly good dyestuffs are obtained if the 2:1 chromium complexes of the amino disazo dyestuffs listed in Table 3 are reacted with the azinylating agents given therein.

Table 3

| No. | 2:1 chromium complex of the amino disazo dyestuffs | Azinylating agent | Shade of cellulose dyeing |
|---|---|---|---|
| 1 | 1-amino-3-methylbenzene ← 2,6-diamino-1-hydroxybenzene-4-sulphonic acid → 1-phenylamino-8-hydroxynaphthalene-4-sulphonic acid. | 2,4,6-trichloropyrimidine. | black. |
| 2 | 1-phenylaminonaphthalene-8-sulphonic acid ← 2,6-diamino-1-hydroxybenzene-4-sulphonic acid → 1-amino-8-hydroxynaphthalene-4-sulphonic acid. | 2,4,5,6-tetrachloropyrimidine. | Do. | sulphonic acid on the one hand with 2-amino-8-hydroxynaphthalene-3,6-disulphonic acid (in acid medium) and on the other with 1-amino-8-hydroxynaphthalene-4-sulphonic acid (in alkaline medium), are dissolved in 250 parts of water and sufficient sodium carbonate is added until the pH of the solution is 10–11. 44.0 parts of the 1:1 chromium complex of the monoazo dyestuff 1-diazo-2-hydroxynaphthalene-4-sulphonic acid → 2-hydroxynaphthalene are then added and the mixture is stirred for 1 hour at 80–85°. After this time, the solution is cooled to 40–50°, the pH is adjusted with acetic acid to 6.5–7.0 and then 20.2 parts of 2,4,6-trichloropyrimidine are added dropwise within 1 hour. The pH is kept at 6.5–7.0 by the gradual addition of sodium carbonate. As soon as no more diazotisable amino groups can be detected, the new dyestuff is precipitated by the addition of sodium chloride, filtered off and dried in vacuo at 40–45°. It is an isomeric mixture and is a dark powder which dissolves in water with a greenish black colour.

If cotton is treated at 50° in the foulard with a 4% solution of this dyestuff, which solution also contains 20 parts of sodium carbonate and 200 parts of urea per litre, the impregnated goods are dried, heated for 4 minutes at 140–160° and finally soaped at the boil for 30 minutes, then a greenish grey-black dyeing which is fast to light and washing is obtained.

Dyestuffs having similar properties are obtained on using the amino disazo dyestuffs given in column 2 of Table 4 and the 1:1 chromium complex of the monoazo dyestuffs given in column 3 of Table 4, if after the forma-

EXAMPLE 4

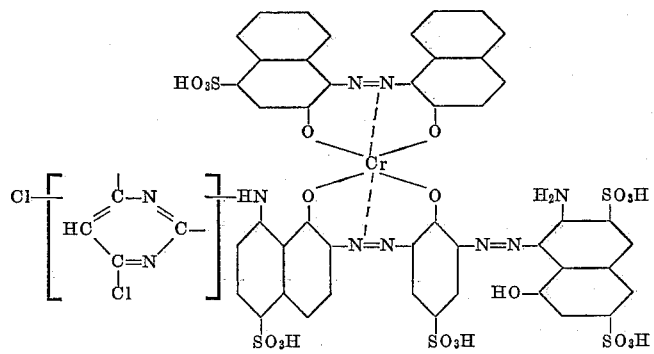

78.4 parts of the amino disazo dyestuff, obtained by coupling tetrazotised 2,6-diamino-1-hydroxybenzene-4-sulphonic acid on the one hand with 2-amino-8-hydroxynaphthalene-3,6-disulphonic acid (in acid medium) and tion of the corresponding 2:1 complexes, they are reacted with the azinylating agents given in column 4 of Table 4.

Table 4

| No. | Aminodisazo dyestuffs | 1:1 chromium complex of monoazo dyestuffs | Azinylating agent | Shade of cellulose dyeing |
|---|---|---|---|---|
| 1 | 2-aminonaphthalene-5,7-disulphonic acid ← 2,6-diamino-1-hydroxybenzene-4-sulphonic acid → 1-amino-8-hydroxynaphthalene-3,6-disulphonic acid. | 1-diazo-2-hydroxynaphthalene-4-sulphonic acid → 2-hydroxynaphthalene. | 2,4,6-trichloropyrimidine | black. |
| 2 | 2-aminonaphthalene-3,6-disulphonic acid ← 2,6-diamino-1-hydroxybenzene-4-sulphonic acid → 1-amino-8-hydroxynaphthalene-4-sulphonic acid. | 1-diazo-2-hydroxynaphthalene-4,6-disulphonic acid → 2-hydroxynaphthalene. | 2,4,5,6-tetrachloropyrimidine | Do. |
| 3 | ----do---- | 1-diazo-2-hydroxynaphthalene-4,8-disulphonic acid → 2-hydroxynaphthalene. | ----do---- | Do. |
| 4 | 1-phenylaminonaphthalene-8-sulphonic acid ← 2,6-diamino-1-hydroxybenzene-4-sulphonic acid → 1-amino-8-hydroxynaphthalene-3,6-disulphonic acid. | 6-nitro-1-diazo-2-hydroxynaphthalene-4-sulphonic acid → 2-hydroxynaphthalene. | ----do---- | Do. |
| 5 | 1-amino-8-hydroxynaphthalene-2,4-disulphonic acid ← 2,6-diamino-1-hydroxybenzene-4-sulphonic acid → 2-amino-5-hydroxynaphthalene-7-sulphonic acid. | 1-diazo-2-hydroxynaphthalene-4-sulphonic acid → 2-hydroxynaphthalene. | ----do---- | Do. |

Table 4—Continued

| No. | Aminodisazo dyestuffs | 1:1 chromium complex of monoazo dyestuffs | Azinylating agent | Shade of cellulose dyeing |
|---|---|---|---|---|
| 6 | 1-amino-3-methylbenzene←——2,6-diamino-1-hydroxybenzene-4-sulphonic acid——→1-hydroxynaphthalene-4-sulphonic acid. | 1-diazo-2-hydroxynaphthalene-4-sulphonic acid——→2-hydroxynaphthalene. | ----do---------------- | violet-black. |
| 7 | 1-amino-3-methylbenzene←——2,6-diamino-1-hydroxybenzene-4-sulphonic acid——→1-hydroxynaphthalene-5-sulphonic acid. | ----do----- | ----do---------------- | Do. |
| 8 | -----do------------ | 6-nitro-1-diazo-2-hydroxynaphthalene-4-sulphonic acid——→1-hydroxynaphthalene. | ----do---------------- | Do |
| 9 | 1-amino-8-hydroxynaphthalene-4-sulphonic acid←——2,6-diamino-1-hydroxybenzene-4-sulphonic acid——→1-hydroxynaphthalene-4-sulphonic acid. | -----do----- | ----do---------------- | black. |

EXAMPLE 5

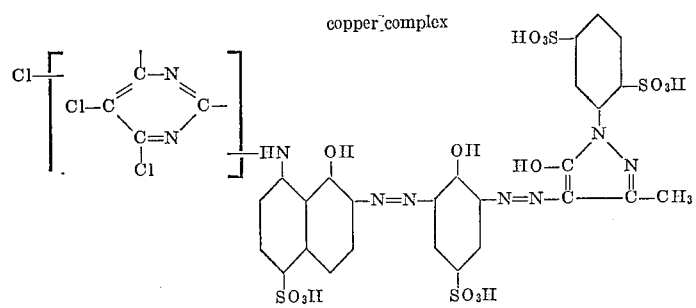

98.1 parts of the sodium salt of the disazo dyestuff, obtained by coupling tetrazotised 2,6-diamino-1-hydroxybenzene-4-sulphonic acid on the one hand with 1-(4',5',6'-trichloropyrimidylamino)-8-hydroxynaphthalene - 4 - sulphonic acid and on the other with 1-(2',5'-disulphophenyl)-3-methyl-pyrazolone-(5), are dissolved with a neutral reaction in 1500 parts of 50–60° warm water. First, 30 parts of crystallised sodium acetate are added and then an aqueous solution of 25.0 parts of crystallised copper sulphate is added dropwise. On completion of the metallisation, the new, copper-containing dyestuff is salted out, filtered off and dried in vacuo at 50–60°. It is an isomeric mixture and is a dark powder which dissolves in water with a reddish black colour. If cotton is treated in the foulard with a solution which contains 40 parts of the above dyestuff, 20 parts of sodium carbonate and 200 parts of urea in 1000 parts of water, steamed for 5–10 minutes at 100–110° and then soaped at the boil for 30 minutes, then a level grey-black dyeing is obtained which is fast to boiling.

Dyestuffs having similar properties are obtainable if disazo dyestuffs produced from 2,6-diamino-1-hydroxybenzene-4-sulphonic acid as central tetrazo component and from the coupling components given in the following Table 5 as $R_1$ and $R_2$, are converted under analogous conditions into the copper or cobalt complexes.

Table 5

| No. | $R_1$ | $R_2$ | Metal | Shade of cellulose dyeing |
|---|---|---|---|---|
| 1 | 1-(4',5',6'-trichloropyrimidyl-amino)-8-hydroxynaphthalene-4-sulphonic acid. | 1-phenyl-3-methyl-pyrazolone-(5) | Co | black. |
| 2 | 1-(4',6'-dichloropyrimidylamino)-8-hydroxynaphthalene-3,6-disulphonic acid. | -----do----- | Co | Do. |
| 3 | -----do----- | 1-(2'-chloro-5'-sulphophenyl)-3-methyl-pyrazolone-(5). | Cu | reddish black. |
| 4 | 1-(4',5',6'-trichloropyrimidyl-amino)-8-hydroxynaphthalene-4,6-disulphonic acid. | 1-(2',5'-dichloro-4'-sulphophenyl)-3-methyl-pyrazolone-(5). | Cu | Do. |
| 5 | 2-(4',5',6'-trichloropyrimidyl-amino)-8-hydroxynaphthalene-6-sulphonic acid. | 1-phenyl-3-methyl-pyrazolone-(5) | Co | black. |

EXAMPLE 6

Cotton or staple fibre is printed by one of the usual methods with the following printing paste:

30 parts of the dyestuff obtained according to Example 1,
200 parts of urea
400 parts of water
350 parts of sodium alginate, 5% aqueous solution
20 parts of sodium carbonate 1,000 parts.

After drying, the printed goods are steamed neutral for 10–15 minutes or are fixed for 5 minutes at 145–150°, then well rinsed and soaped at the boil for 30 minutes. The dark, navy blue print has excellent wet fastness properties. The printing paste described above can be stored well.

What we claim is:

1. A metal-containing reactive dyestuff which contains one atom of a metal selected from the group consisting of copper and cobalt in complex union with one molecule in the case of copper and with two molecules in the case of cobalt of a disazo dyestuff of the formula

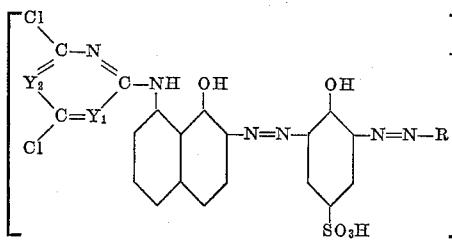

wherein one of $Y_1$ and $Y_2$ is $=N-$ and the other is

R is a member selected from the group consisting of radicals of coupling components of the benzene, naphthalene and 1-phenyl-5-pyrazolone series, the radical containing —OH in ortho-position to the azo group to which R is directly bound, and $m$ is a positive whole number of at most 4.

2. A metal-containing, reactive dyestuff which contains one atom of copper in complex union with one molecule of a disazo dyestuff of the general formula

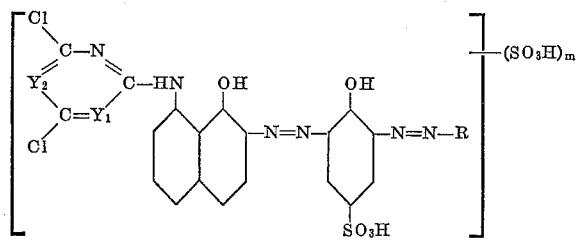

wherein of $Y_1$ and $Y_2$ the one is $=N-$ and the other is

R represents the radical of a naphtholic coupling component containing the hydroxyl group in o-position to the azo group, and $m$ is a positive whole number of at most 4.

3. The metal-containing, reactive dyestuff which contains one atom of copper in complex union with one molecule of a disazo dyestuff of the formula

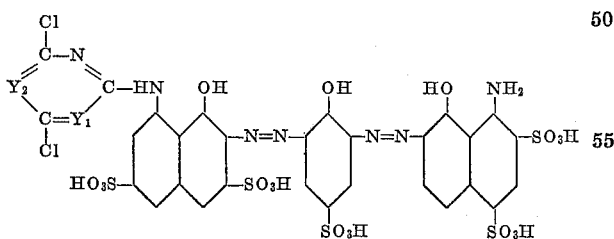

wherein of $Y_1$ and $Y_2$ the one is $=N-$ and the other is

4. The metal-containing reactive dyestuff which contains one atom of cobalt in complex union with two molecules of a disazo dyestuff of the formula

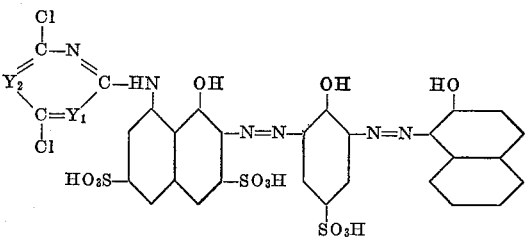

wherein of $Y_1$ and $Y_2$ the one is $=N-$ and the other is

5. The metal-containing reactive dyestuff which contains one atom of cobalt in complex union with two molecules of a disazo dyestuff of the formula

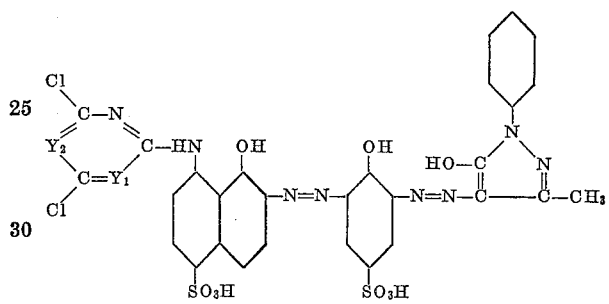

wherein of $Y_1$ and $Y_2$, the one is $=N-$ and the other is

6. The metal-containing, reactive dyestuff which contains one atom of copper in complex union with one molecule of a disazo dyestuff of the formula

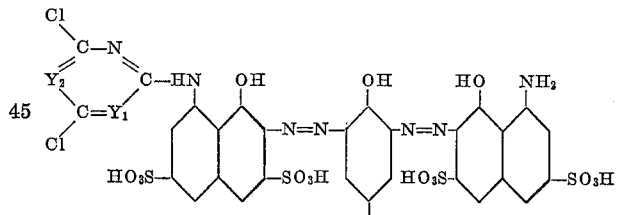

wherein of $Y_1$ and $Y_2$ the one is $=N-$ and the other is

References Cited in the file of this patent

UNITED STATES PATENTS

| | | |
|---|---|---|
| 677,227 | Julius | June 25, 1901 |
| 677,228 | Julius | June 25, 1901 |
| 2,892,671 | Alsberg et al. | June 30, 1959 |
| 2,935,506 | Heslop et al. | May 3, 1960 |

FOREIGN PATENTS

| | | |
|---|---|---|
| 1,247,660 | France | Oct. 24, 1960 |